(12) United States Patent
Nagai

(10) Patent No.: US 11,175,875 B2
(45) Date of Patent: Nov. 16, 2021

(54) EYEGLASS-MOUNTED IMAGE DISPLAY DEVICE AND IMAGE SYSTEM

(71) Applicant: HOGY MEDICAL CO., LTD., Tokyo (JP)

(72) Inventor: Shunsuke Nagai, Tokyo (JP)

(73) Assignee: HOGY MEDICAL CO., LTD., Tokyo (JP)

( * ) Notice: Subject to any disclaimer, the term of this patent is extended or adjusted under 35 U.S.C. 154(b) by 0 days.

(21) Appl. No.: 16/769,156

(22) PCT Filed: Oct. 16, 2018

(86) PCT No.: PCT/JP2018/038433
§ 371 (c)(1),
(2) Date: Jun. 2, 2020

(87) PCT Pub. No.: WO2019/111539
PCT Pub. Date: Jun. 13, 2019

(65) Prior Publication Data
US 2021/0216264 A1    Jul. 15, 2021

(30) Foreign Application Priority Data
Dec. 4, 2017  (JP) .............................. JP2017-232540

(51) Int. Cl.
*G06F 3/14*     (2006.01)
*G02C 11/00*    (2006.01)

(52) U.S. Cl.
CPC ............ *G06F 3/1423* (2013.01); *G02C 11/10* (2013.01)

(58) Field of Classification Search
CPC .......... G02B 27/017; G02B 2027/0178; G02B 2027/0138; G06F 3/013; G06F 3/017;
(Continued)

(56) References Cited

U.S. PATENT DOCUMENTS

| 9,970,955 B1* | 5/2018 | Homyk ................ A61B 5/0261 |
| 2010/0164840 A1* | 7/2010 | Yamamoto ......... G02B 27/0172 345/8 |
| 2016/0161746 A1* | 6/2016 | Ahearn .............. G02B 27/0176 359/630 |

FOREIGN PATENT DOCUMENTS

| JP | 2013-195924 A | 9/2013 |
| JP | 2014-041218 A | 3/2014 |

(Continued)

OTHER PUBLICATIONS

International Search Report for PCT/JP2018/038433 dated Jan. 15, 2019 [PCT/ISA/210].
(Continued)

*Primary Examiner* — Robert J Michaud
(74) *Attorney, Agent, or Firm* — Sughrue Mion, PLLC

(57) ABSTRACT

Provided are an eyeglass-mounted image display device capable of adjusting the interval between, height of, and elevation/depression angle of viewers detachably attached to eyeglasses, and an image display system using the eyeglass-mounted image display device. The eyeglass-mounted image display device includes: viewers 7 displaying an image from an endoscope serving as an image output apparatus; and eyeglasses 1 to which the viewers 7 are detachably attached via an attaching member 8. The viewers 7 are disposed in front of lenses 3 of the eyeglasses 1, and the interval between, height of, and elevation/depression angle of the viewers 7 are adjustable with the attaching member 8.

7 Claims, 16 Drawing Sheets

(58) Field of Classification Search
CPC ........ G06F 3/011; G06F 1/163; G06F 3/1423; G02C 11/10
See application file for complete search history.

(56) References Cited

FOREIGN PATENT DOCUMENTS

| | | |
|---|---|---|
| JP | 2015-213252 A | 11/2015 |
| JP | 2016-32485 A | 3/2016 |
| JP | 2016-86341 A | 5/2016 |
| JP | 2016-158911 A | 9/2016 |
| JP | 2017-192007 A | 10/2017 |

OTHER PUBLICATIONS

Written Opinion for PCT/JP2018/038433 dated Jan. 15, 2019 [PCT/ISA/237].

* cited by examiner

EYEGLASS-MOUNTED IMAGE DISPLAY DEVICE AND IMAGE SYSTEM

CROSS REFERENCE TO RELATED APPLICATIONS

This application is a National Stage of International Application No. PCT/JP2018/038433 filed Oct. 16, 2018, claiming priority based on Japanese Patent Application No. 2017-232540 filed Dec. 4, 2017.

TECHNICAL FIELD

The present invention relates to an eyeglass-mounted image display device and an image display system, and in particular to an eyeglass-mounted image display device capable of adjusting the interval between, height of, and elevation/depression angle of viewers detachably attached to eyeglasses, and an image display system using the eyeglass-mounted image display device.

BACKGROUND ART

Endoscopic surgery, which can improve postoperative quality of life (QOL) by, e.g., reducing the invasion of a patient's body, has been widely performed in recent years.

In endoscopic surgery, certain treatments may be performed by an operator inserting various treatment instruments such as an endoscope and forceps into a patient's body and operating the treatment instruments while viewing an endoscopic image displayed on a head-mounted image display device. Patent literature 1 discloses an exemplary head-mounted image display device.

Using the head-mounted image display device advantageously enables the operator to perform endoscopic surgery in an appropriate posture without the need to unnaturally turn the operator's body toward a monitor.

However, the head-mounted image display device is heavy. Further, wearing the image display device significantly narrows the operator's visual field. This pauses problems, for example failure to smoothly pass or receive surgical instruments such as knives during surgery.

In this regard, patent literature 2 discloses an eyeglass-mounted image display device that is lightweight and does not narrow the visual field.

This eyeglass-mounted image display device will hereinafter be referred to as a conventional image display device and described with reference to drawings.

FIG. 15 is a perspective view showing the conventional image display device. FIG. 16 is a side cross-sectional view showing a use situation of the conventional image display device.

As shown in FIGS. 15 and 16, the conventional image display device has an exemplary configuration such that viewers 22 displaying an endoscopic image are attached to eyeglasses 23. The viewers 22 extend through openings 24a provided on lenses 24 and are attached to a frame 26 via a connecting member 25.

The conventional image display device is lightweight and further allows viewing the surroundings without significantly narrowing the visual field. For example, the device will not hinder passing or receiving surgical instruments such as knives during surgery.

CITATION LIST

Patent Literature

Patent Literature 1: Japanese Patent Laid-Open No. 2013-195924

Patent Literature 2: Japanese Patent Laid-Open No. 2015-213252

SUMMARY OF INVENTION

Technical Problem

The conventional image display device, however, has the following problems.

The conventional image display device lacks adaptability because it does not allow freely adjusting the interval between the viewers 22, the height of the viewers 22, or the elevation/depression angle of the viewers 22. That is, the conventional image display device lacks adaptability in that it cannot be shared among operators due to variations among individual human bodies. Consequently, an operator-specific image display device needs to be made, which is costly.

In addition, the lenses 24 need to be processed for the viewers 22 to be inserted into the openings 24a provided on the lenses 24. Scattered objects may also enter through the gaps between the viewers 22 and the lenses 24 during surgery.

An object of the present invention is therefore to provide an eyeglass-mounted image display device that has viewers detachably attached to eyeglasses and allows adjusting the interval between, height of, and elevation/depression angle of the viewers, thereby enabling the viewers to be shared among operators and consequently enabling cost reduction.

Another object of the present invention is to provide the eyeglass-mounted image display device that has the viewers disposed in front of lenses to enable a wider visual field.

A further object of the present invention is to provide the eyeglass-mounted image display device in which temples near the lenses of the eyeglasses are disposed above the lenses so as not to hinder the visual field, thereby enabling a wider visual field especially on the sides.

A still further object of the present invention is to provide the eyeglass-mounted image display device that has the viewers disposed in front of the lenses to eliminate the need to make openings on the lenses, thereby eliminating the need to process the lenses and further eliminating the possibility of scattered objects entering through the lenses during surgery.

A still further object of the present invention is to provide the eyeglass-mounted image display device in which a member for attaching the viewers is detachable so that the device can be readily adapted to even a strabismic operator.

A still further object of the present invention is to provide an image display system that enables multiple operators to simultaneously use eyeglass-mounted image display devices, thereby enabling endoscopic surgery to be more appropriately performed.

A still further object of the present invention is to provide the image display system that enables each operator to individually operate the brightness and rotation of an image on the viewers, thereby enabling the operator to perform endoscopic surgery while maintaining the optimal visual field.

Solution to Problem

The present invention has been made for accomplishing the above objects and has the following features.

An aspect of the present invention according to claim 1 is an eyeglass-mounted image display device including: viewers displaying an image from an image output apparatus; and eyeglasses to which the viewers are detachably attached via an attaching member, the device being characterized in that the viewers are disposed in front of lenses of the eyeglasses, and the interval between, height of, and elevation/depression angle of the viewers are adjustable with the attaching member.

An aspect of the present invention according to claim 2 is the eyeglass-mounted image display device according to claim 1, characterized in that the attaching member includes a first member attached to the eyeglasses in a height-adjustable manner, a second member attached to the first member in an elevation/depression angle-adjustable manner, and a pair of right and left third members detachably attached to the second member in an interval-adjustable manner, and the viewers are attached to the third members.

An aspect of the present invention according to claim 3 is the eyeglass-mounted image display device according to claim 2, characterized in that the right and left third members are individually attached to the second member.

An aspect of the present invention according to claim 4 is the eyeglass-mounted image display device according to claim 2 or 3, characterized in that the viewers are detachably attached to the third members.

An aspect of the present invention according to claim 5 is the eyeglass-mounted image display device according to any one of claims 1 to 4, characterized in that temples near the lenses of the eyeglasses are disposed above the lenses of the eyeglasses.

An aspect of the present invention according to claim 6 is the eyeglass-mounted image display device according to any one of claims 1 to 5, characterized in that the image output apparatus includes an endoscope, a microscope, or a video camera.

An aspect of the present invention according to claim 7 is an image display system using the eyeglass-mounted image display device according to any one of claims 1 to 6, characterized by being capable of sending an endoscopic image signal to a plurality of eyeglass-mounted image display devices via a splitter.

An aspect of the present invention according to claim 8 is the image display system according to claim 7, characterized in that a controller is provided between the splitter and each of the plurality of eyeglass-mounted image display devices, the controller having functions of allowing the brightness of an image on the viewers to be adjusted and allowing the image on the viewers to be rotated.

Advantageous Effects of Invention

According to the eyeglass-mounted image display device of the present invention, the viewers are detachably attached to the eyeglasses, and the interval between, height of, and elevation/depression angle of the viewers are adjustable. This enables the viewers to be shared among operators and consequently enables cost reduction.

According to the eyeglass-mounted image display device of the present invention, the viewers are disposed in front of the lenses to enable a wider visual field.

According to the eyeglass-mounted image display device of the present invention, the temples near the lenses of the eyeglasses are disposed above the lenses and therefore do not to hinder the visual field. This enables a wider visual field especially on the sides.

According to the eyeglass-mounted image display device of the present invention, the viewers are disposed in front of the lenses to eliminate the need to make openings on the lenses. This eliminates the need to process the lenses and further eliminates the possibility of scattered objects entering through the lenses during surgery.

According to the eyeglass-mounted image display device of the present invention, the member to which the viewers are attached is detachable. This enables the device to be readily adapted to even a strabismic operator.

According to the image display system of the present invention, the splitter is used to enable multiple operators to simultaneously use eyeglass-mounted image display devices. This enables endoscopic surgery to be more appropriately performed.

According to the image display system of the present invention, the controller is used to enable each operator to individually operate the brightness and rotation of the image on the viewers. This enables the operator to perform endoscopic surgery while maintaining the optimal visual field.

DESCRIPTION OF EMBODIMENT

An embodiment of an eyeglass-mounted image display device of the present invention will be described below with reference to drawings.

Figure 1:
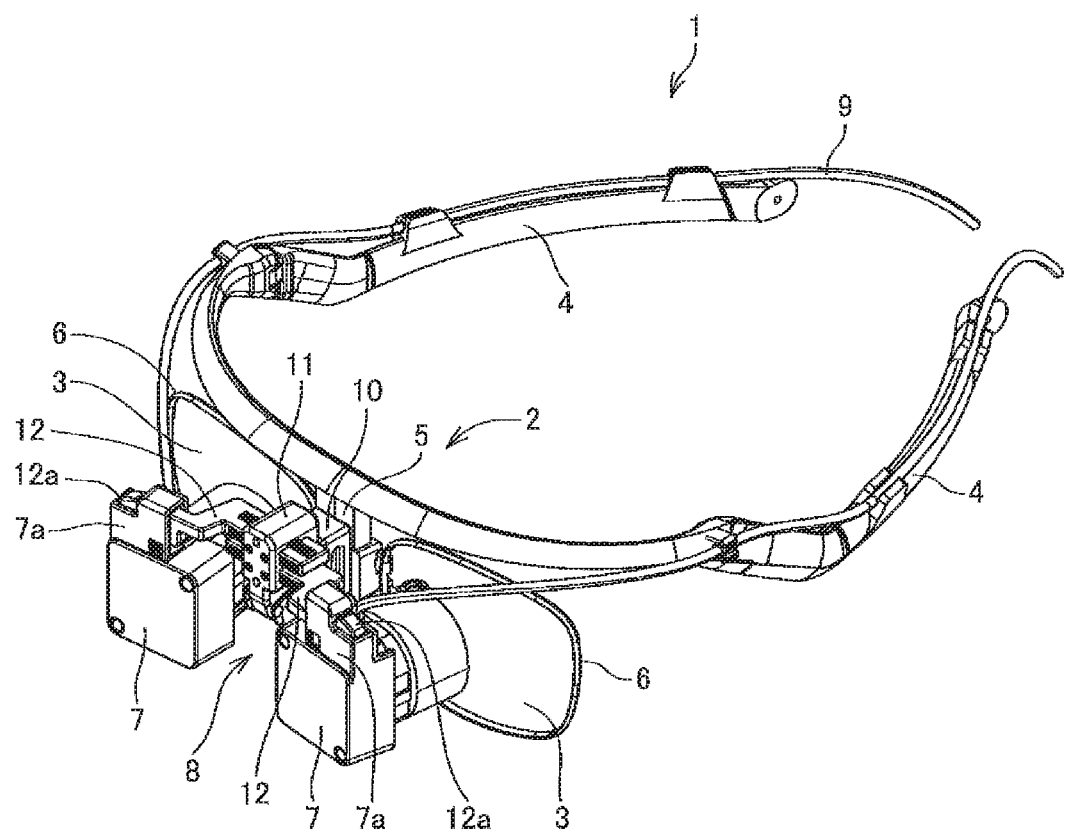
FIG. 1 is a perspective view showing an eyeglass-mounted image display device of the present invention.
Figure 2:
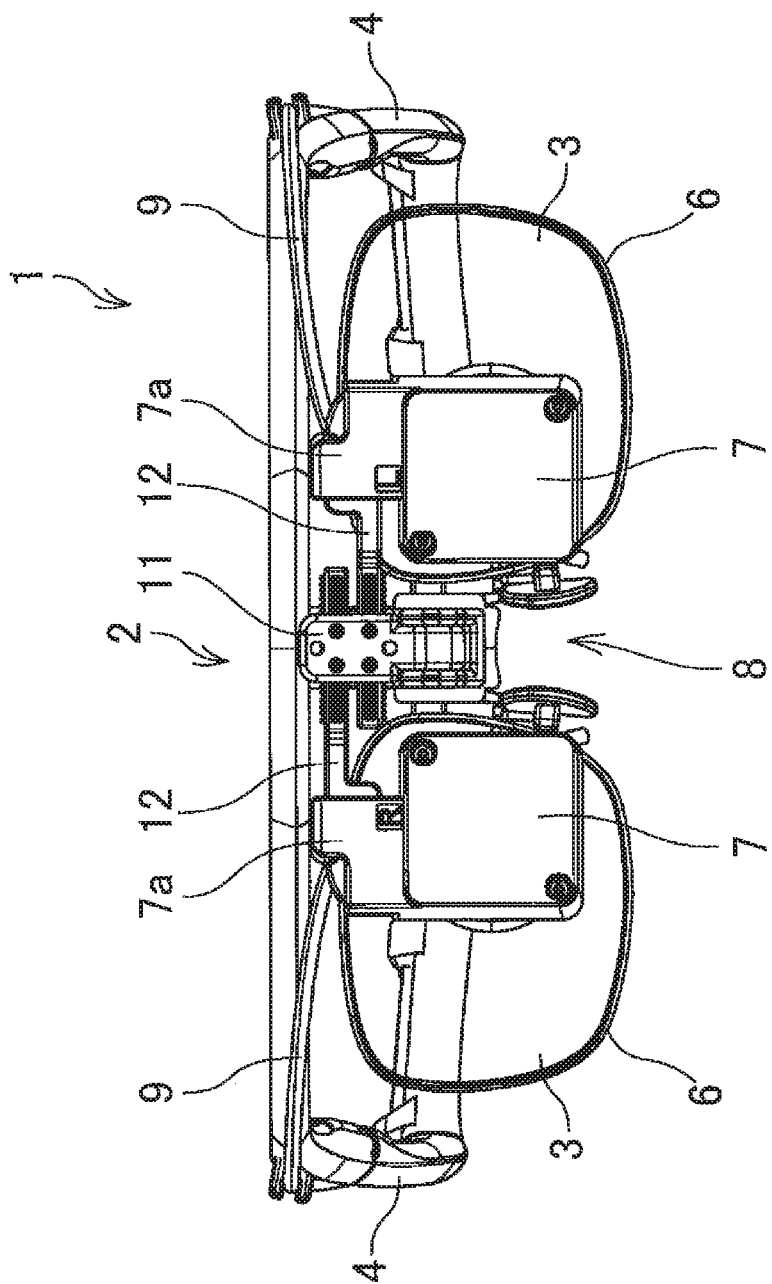
FIG. 2 is a front view showing the eyeglass-mounted image display device of the present invention.
Figure 3:
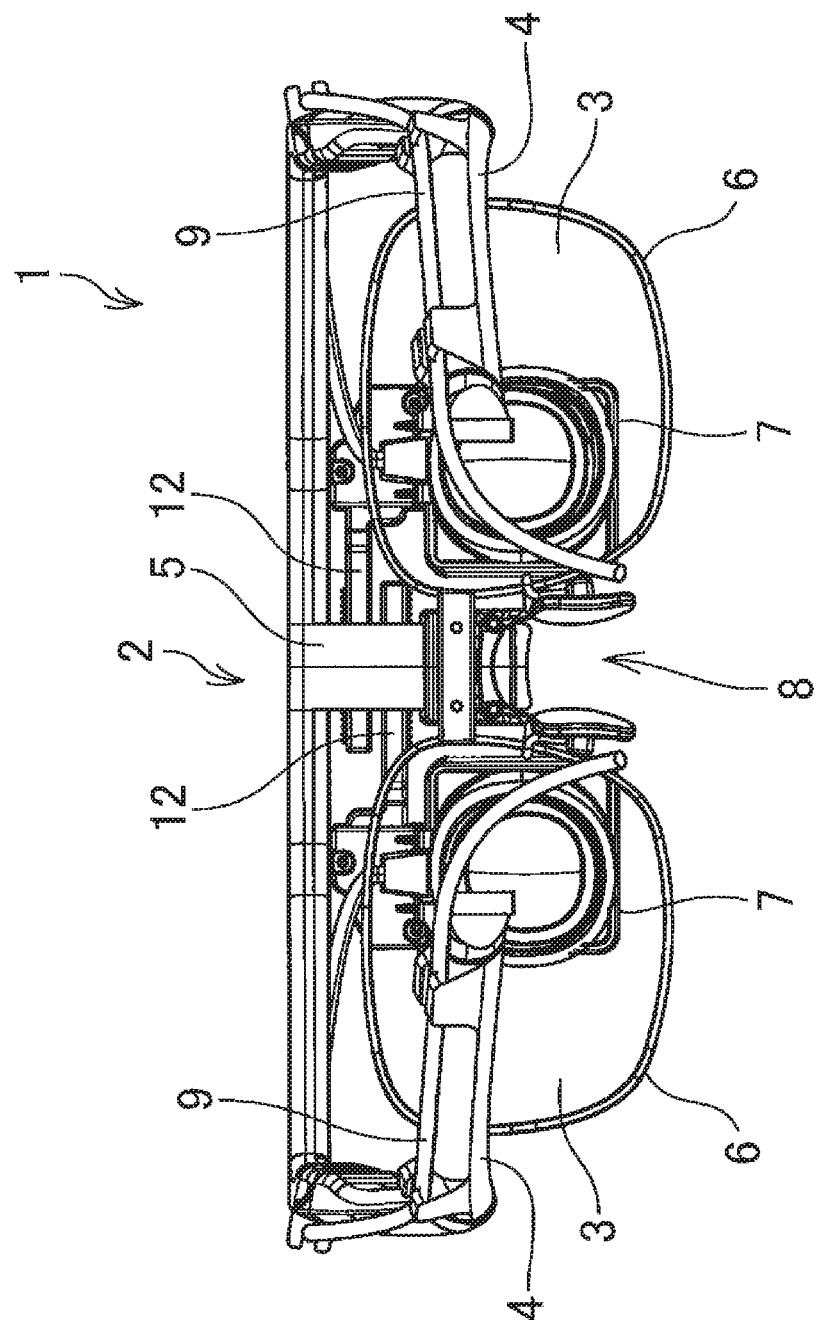
FIG. 3 is a rear view showing the eyeglass-mounted image display device of the present invention.
Figure 4:
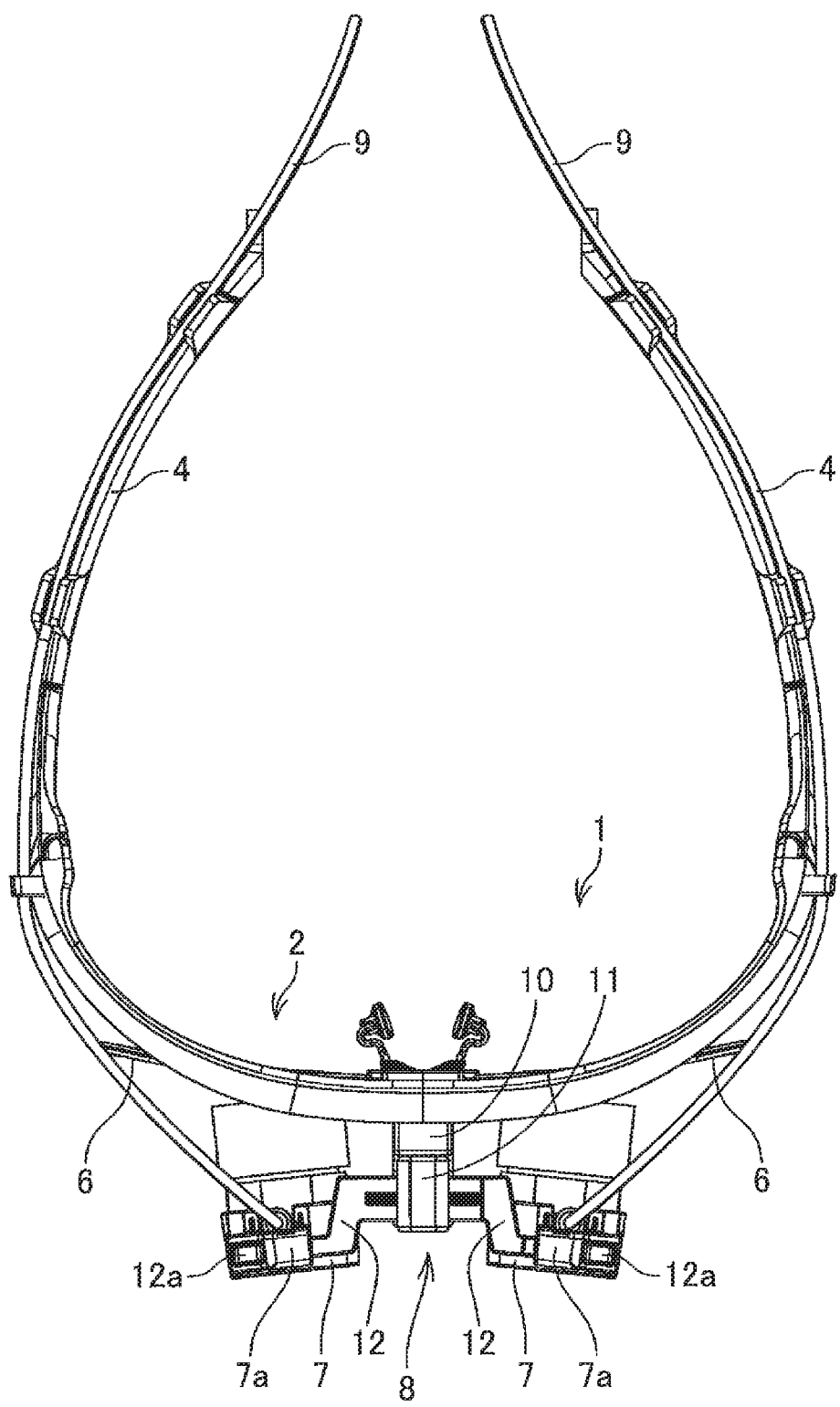
FIG. 4 is a plan view showing the eyeglass-mounted image display device of the present invention.
Figure 5:
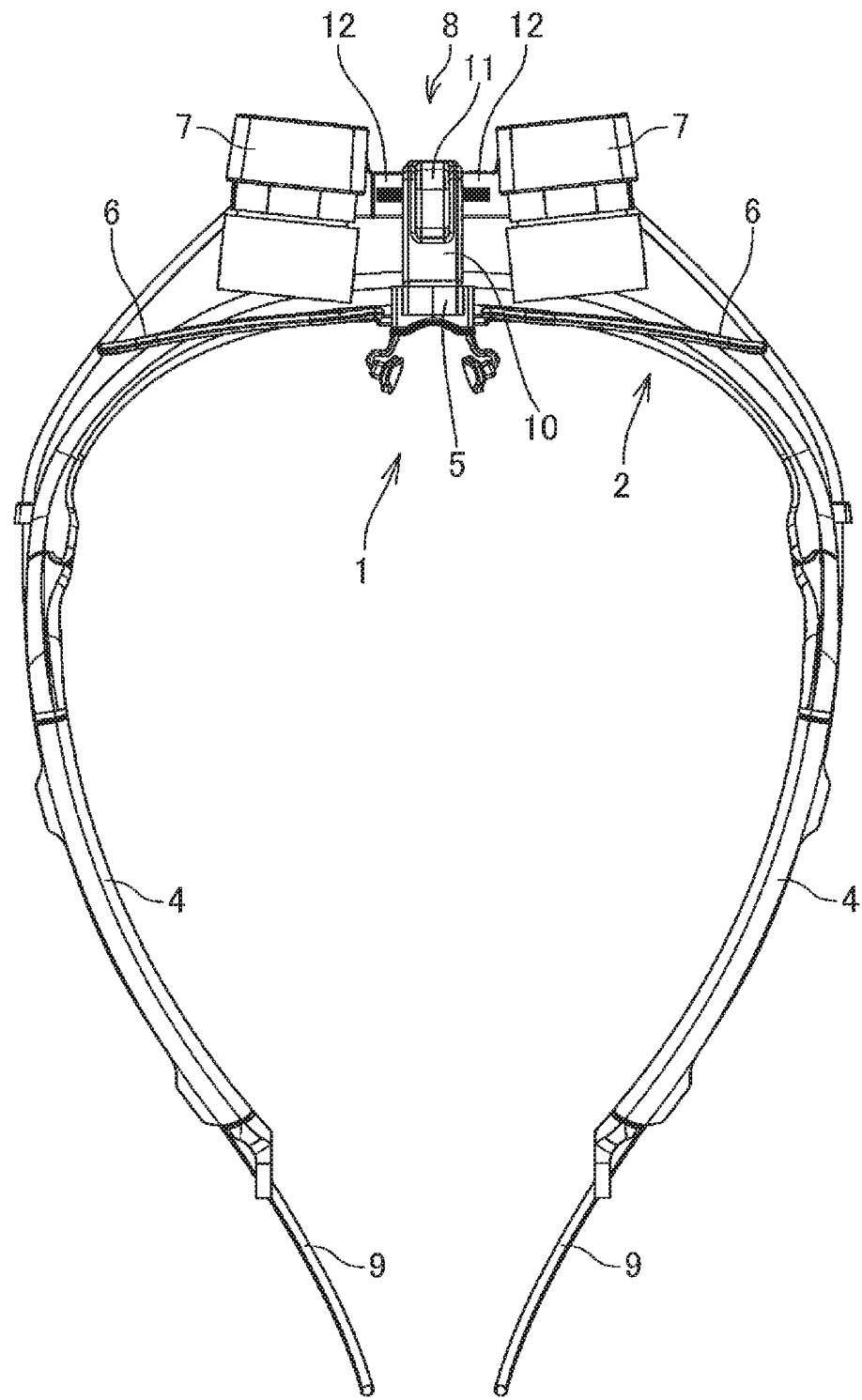
FIG. 5 is a bottom view showing the eyeglass-mounted image display device of the present invention.
Figure 6:
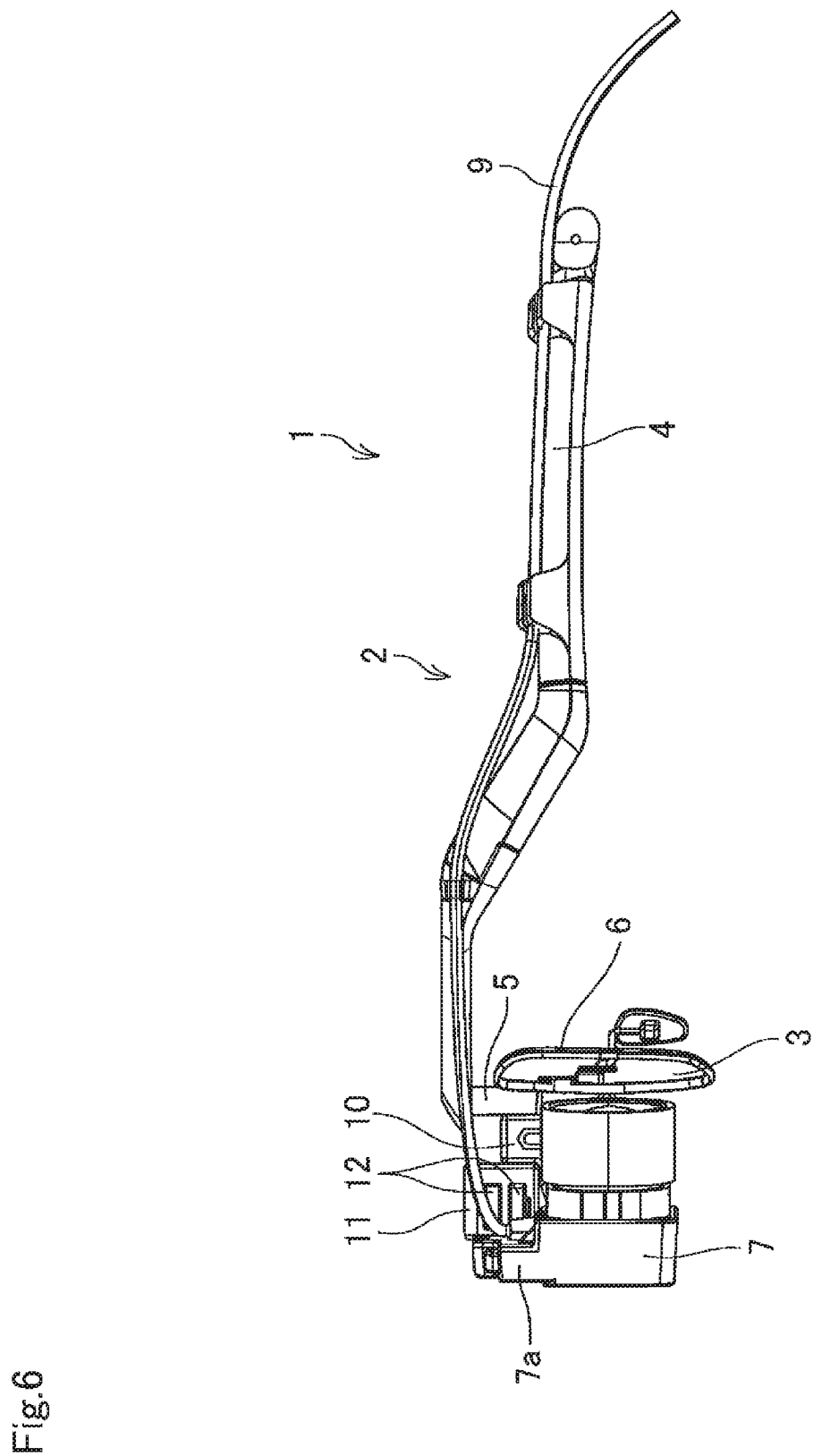
FIG. 6 is a right side view showing the eyeglass-mounted image display device of the present invention.

FIG. 1 is a perspective view showing an eyeglass-mounted image display device of the present invention. FIG. 2 is a front view showing the eyeglass-mounted image display device of the present invention. FIG. 3 is a rear view showing the eyeglass-mounted image display device of the present invention. FIG. 4 is a plan view showing the eyeglass-mounted image display device of the present invention. FIG. 5 is a bottom view showing the eyeglass-mounted image display device of the present invention. FIG.

Figure 7:
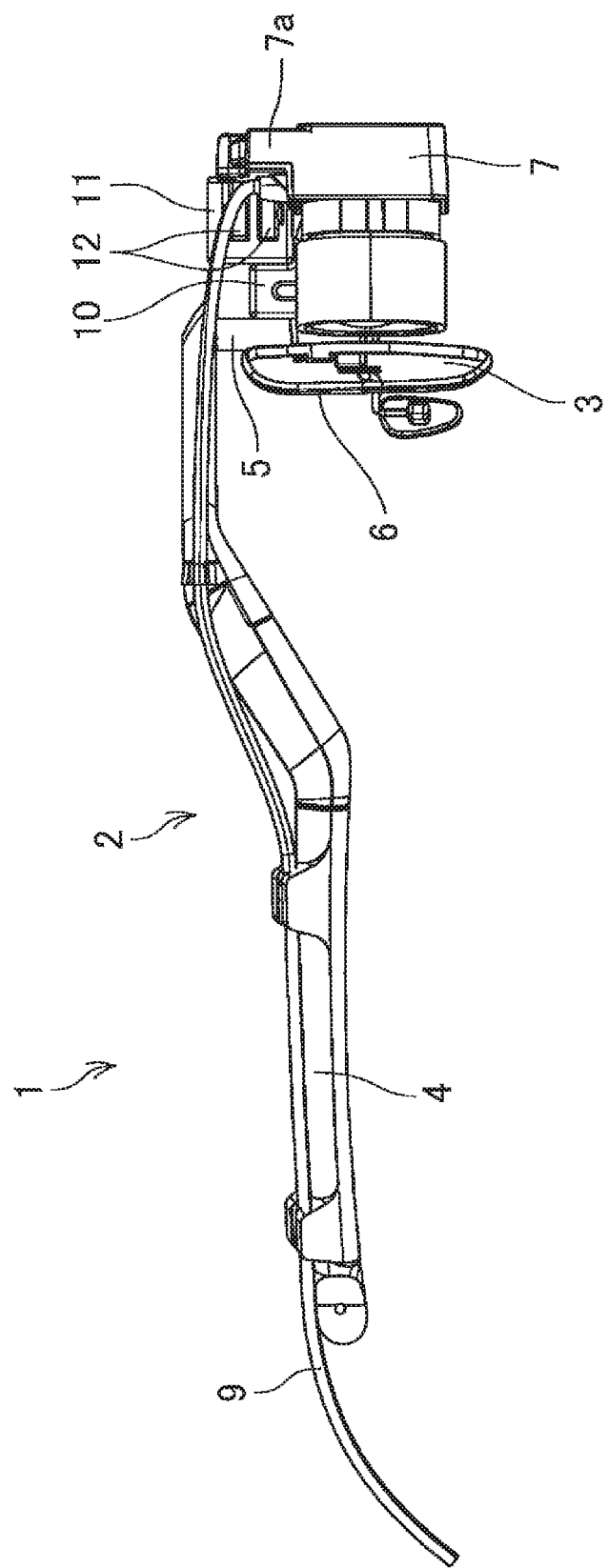
FIG. 7 is a left side view showing the eyeglass-mounted image display device of the present invention.
Figure 8:
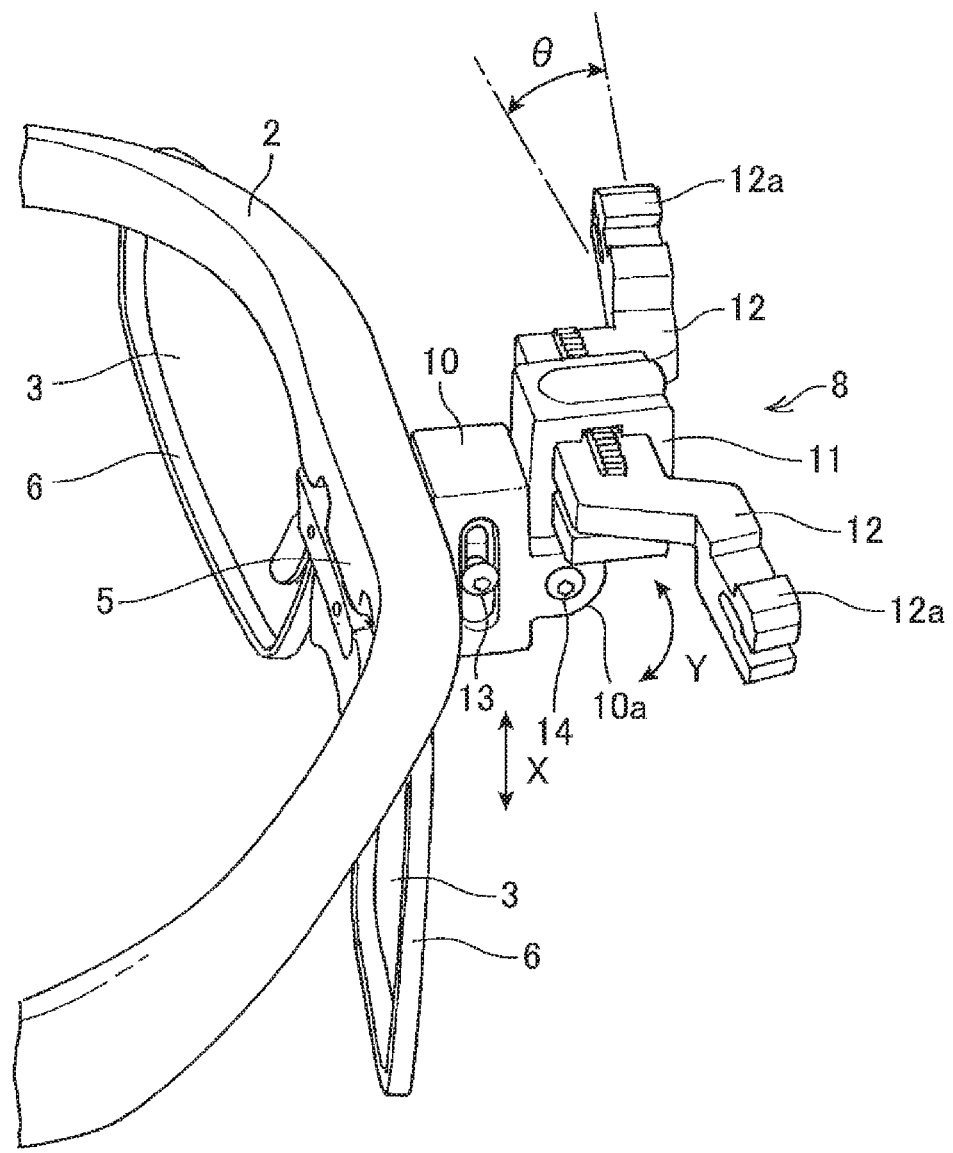
FIG. 8 is a partial perspective view showing the eyeglass-mounted image display device of the present invention with viewers detached.
Figure 9:
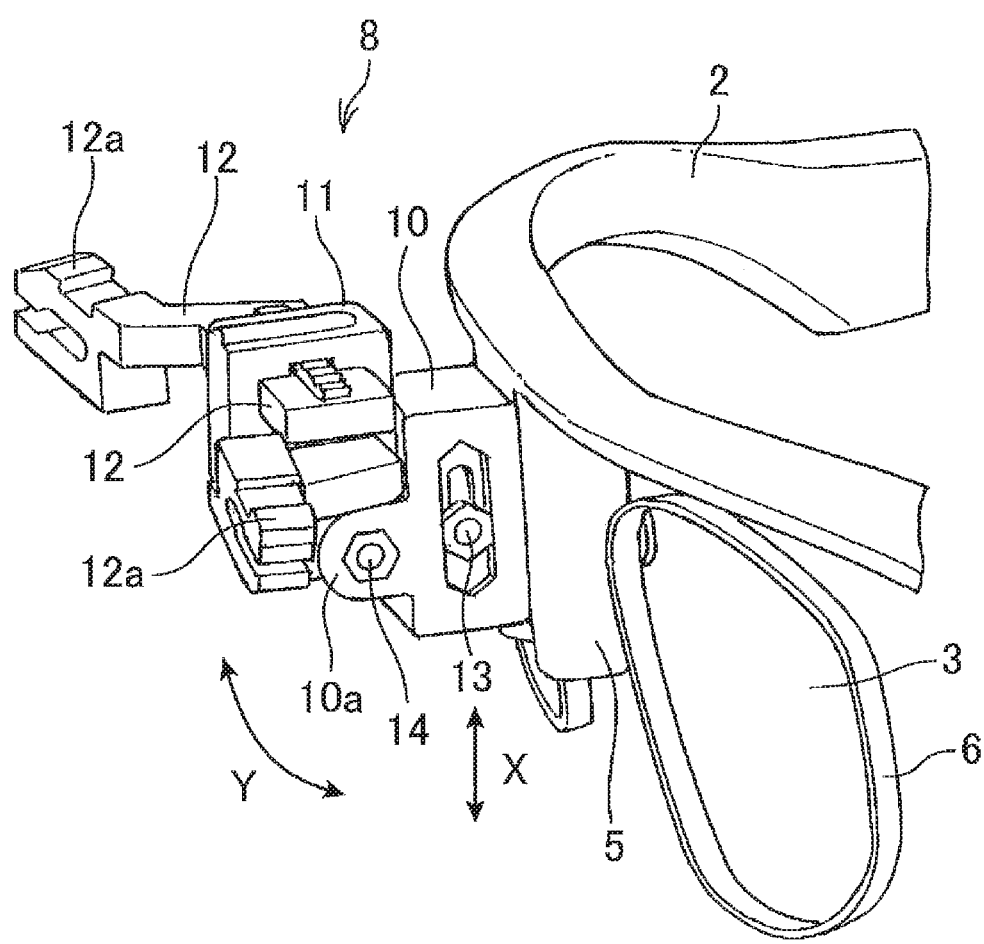
FIG. 9 is another partial perspective view showing the eyeglass-mounted image display device of the present invention with the viewers detached.
Figure 10:
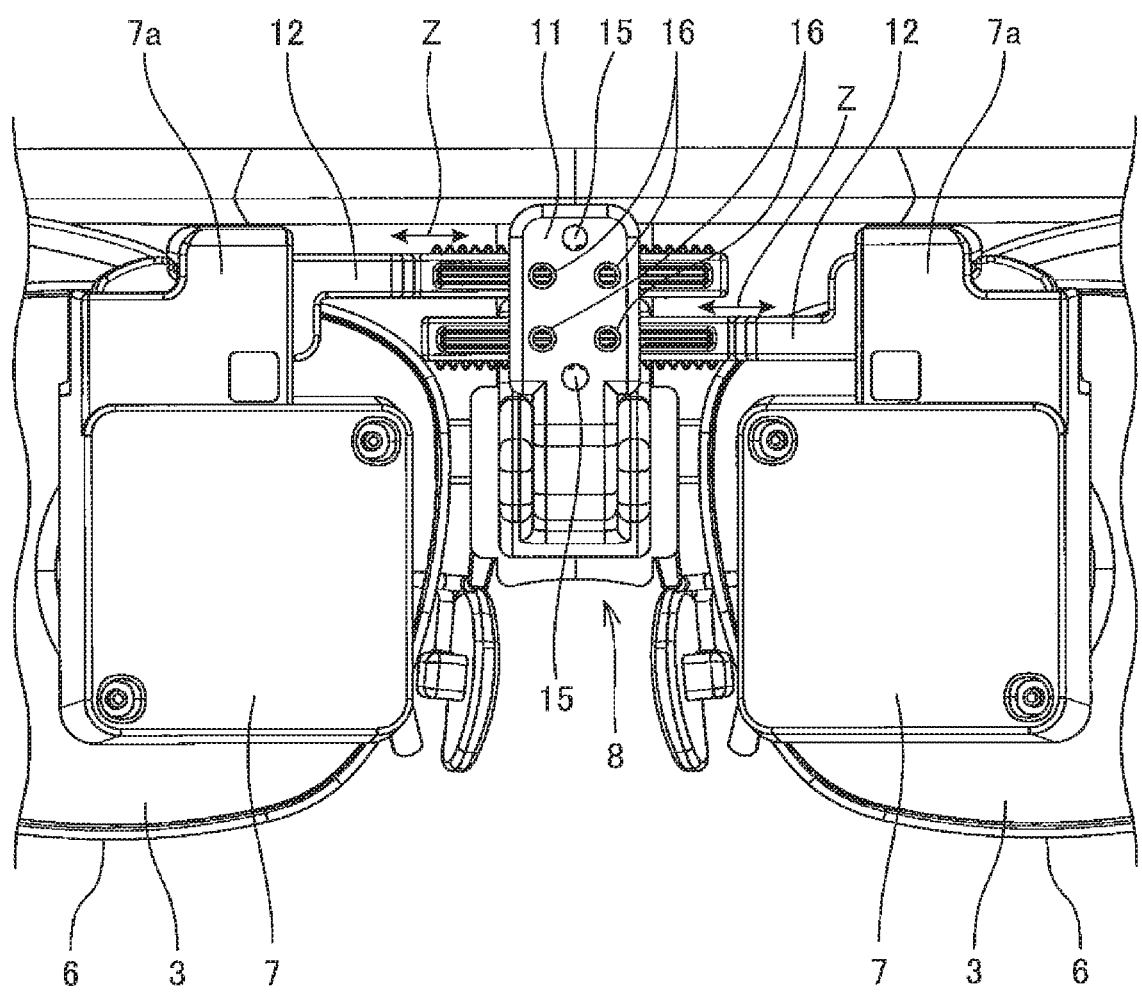
FIG. 10 is a partial front view showing the eyeglass-mounted image display device of the present invention.

6 is a right side view showing the eyeglass-mounted image display device of the present invention. FIG. 7 is a left side view showing the eyeglass-mounted image display device of the present invention. FIG. 8 is a partial perspective view showing the eyeglass-mounted image display device of the present invention with viewers detached. FIG. 9 is another partial perspective view showing the eyeglass-mounted image display device of the present invention with the viewers detached. FIG. 10 is a partial front view showing the eyeglass-mounted image display device of the present invention.

In FIGS. 1 to 10, reference numeral 1 denotes eyeglasses adjusted according to an operator's personal ophthalmic prescription. The eyeglasses 1 includes a frame 2 and lenses 3. The frame 2 has a pair of right and left temples 4, a bridge 5 provided between the temples 4, and a pair of right and left rims 6 attached to the bridge 5. The lenses 3 are fitted into the rims 6.

Near the lenses 3 of the eyeglasses 1, the temples 4 are disposed above the lenses 3. This prevents the temples 4 from hindering the visual field and therefore can provide a wider visual field especially on the sides.

In this example, the pair of right and left temples 4 are integrally formed, and the bridge 5 is formed under the midpoint between the temples 4 integrally to the temples 4. Alternatively, the right and left temples 4 may be separate and connected by the bridge 5.

Also, as with typical eyeglasses, the temples 4 may be attached to the pair of right and left rims 6, respectively, and the temples 4 are connected by the bridge 5.

Reference numeral 7 denotes a pair of right and left viewers for an endoscope serving as an image output apparatus; the viewers are attached to the eyeglasses 1 via an attaching member 8. The viewers 7 are disposed in front of the lenses 3 of the eyeglasses 1. An image signal from an endoscope system (to be described below) is sent to the viewers 7 through cables 9, so that the operator can view an endoscopic image in an appropriate posture without the need to unnaturally turn the body toward a monitor.

In addition to the endoscope, examples of the image output apparatus include a microscope and a video camera. The endoscope may be a rigid endoscope, a flexible endoscope, or an endoscope attached to a surgery-assisting robot. The microscope may be an electron microscope.

The attaching member 8 includes a first member 10 attached to the bridge 5 of the eyeglasses 1 in a height-adjustable manner, a second member 11 attached to the first member 10 in an elevation/depression angle-adjustable manner, and a pair of right and left third members 12 detachably attached to the second member 11 in an interval-adjustable manner. The right and left third members 12 are individually attached to the second member 11.

The first member 10 is attached to the bridge 5 in the frame 2 of the eyeglasses 1 with height adjustment bolt and nut 13 so that the height is adjustable (see FIGS. 8 and 9). Arrows X in FIGS. 8 and 9 indicate the height adjustment directions.

The second member 11 is attached to a projecting portion 10a of the first member 10 with elevation/depression angle adjustment bolt and nut 14 so that the elevation/depression angle is adjustable (see FIGS. 8 and 9). Arrows Y in FIGS. 8 and 9 indicate the elevation/depression angle adjustment directions.

The inner end of each of the pair of right and left third members 12 is attached to the second member 11 via a rack-and-pinion mechanism in a horizontally translatable manner. Rotating the pinions of the rack-and-pinion mechanism, i.e., rotating fine-tuning screws 15, enables fine-tuning the interval between the right and left third members 12. The interval between the right and left viewers 7 can thus be adjusted. Arrows Z in FIG. 10 indicate the interval adjustment directions.

Once the interval between the right and left viewers 7 is determined, fixing screws 16 are tightened to fix the interval between the right and left viewers 7.

The viewers 7 are detachably attached to the outer ends of the third members 12. That is, the outer end of each third member 12 is bifurcately formed (see FIGS. 8 and 9), and each viewer 7 has an insertion portion 7a formed at the top so that the outer end of the third member 12 can be inserted into the insertion portion 7a (see FIG. 10).

When the bifurcated outer end of the third member 12 is inserted into the insertion portion 7a of the viewer 7, the bifurcated outer end is internally deformed against its elastic force. After inserted, the bifurcated outer end returns to its original state due to its elastic force and expands to engage with the insertion portion 7a. The viewer 7 is thus attached to the third member 12 so as not to be detached with one touch.

To detach the viewer 7 from the third member 12, a press portion 12a of the bifurcated outer end of the third member 12 exposed at the top of the insertion portion 7a is pressed with a finger to deform the bifurcated outer end against its elastic force. The viewer 7 is then pulled out from the bifurcated outer end of the third member 12. The viewer 7 can thus be detached from the third member 12.

Because the viewers 7 are attached to the third members 12 that are detachably attached to the second member 11, the device can be readily adapted to even a strabismic operator by replacing the third members 12 with third members 12 having a different bend angle. θ in FIG. 8 indicates the bend angle of the third members 12.

Attaching a camera having a zoom function to the eyeglasses 1 allows a more precise view of a diseased site to facilitate endoscopic surgery.

An aspect of an image display system using eyeglass-mounted image display devices A of the present invention configured as above will now be described with reference to a drawing.

Figure 11:
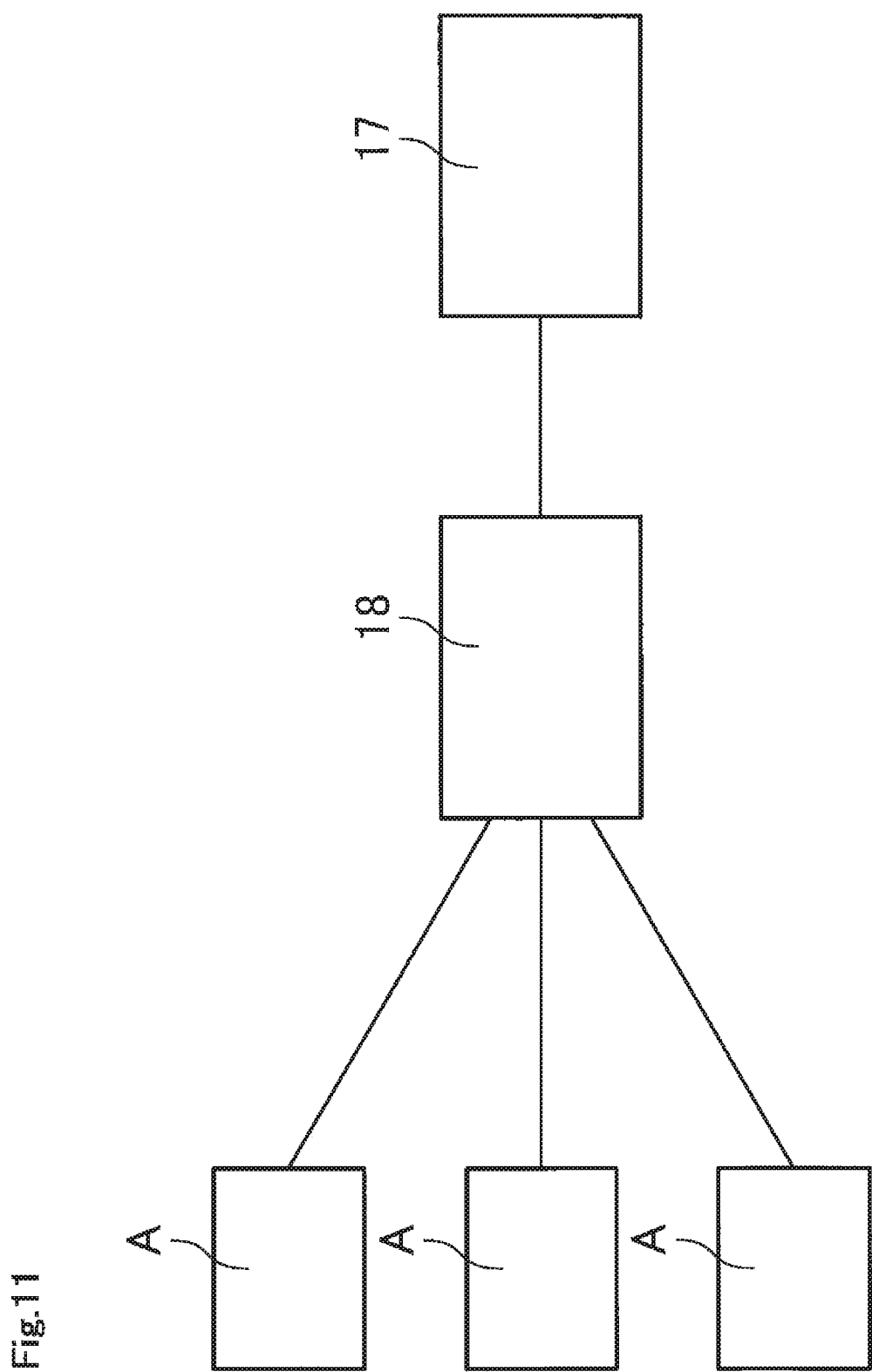
FIG. 11 is a configuration diagram showing an image display system of the present invention.

FIG. 11 is a configuration diagram showing an image display system of the present invention.

As shown in FIG. 11, in the image display system of the present invention, an image signal from an endoscope system 17 is sent to multiple (three in this example) eyeglass-mounted image display devices A via a splitter 18.

In this manner, sending an image signal from the endoscope system 17 to the multiple eyeglass-mounted image display devices A via the splitter 18 enables simultaneous use by multiple operators. As a result, endoscopic surgery can be more appropriately performed. Further, if the eyeglass-mounted image display devices A are used in endoscopic surgery training, multiple persons can simultaneously take the training.

Another image display system of the present invention will now be described with reference to drawings.

Figure 12:
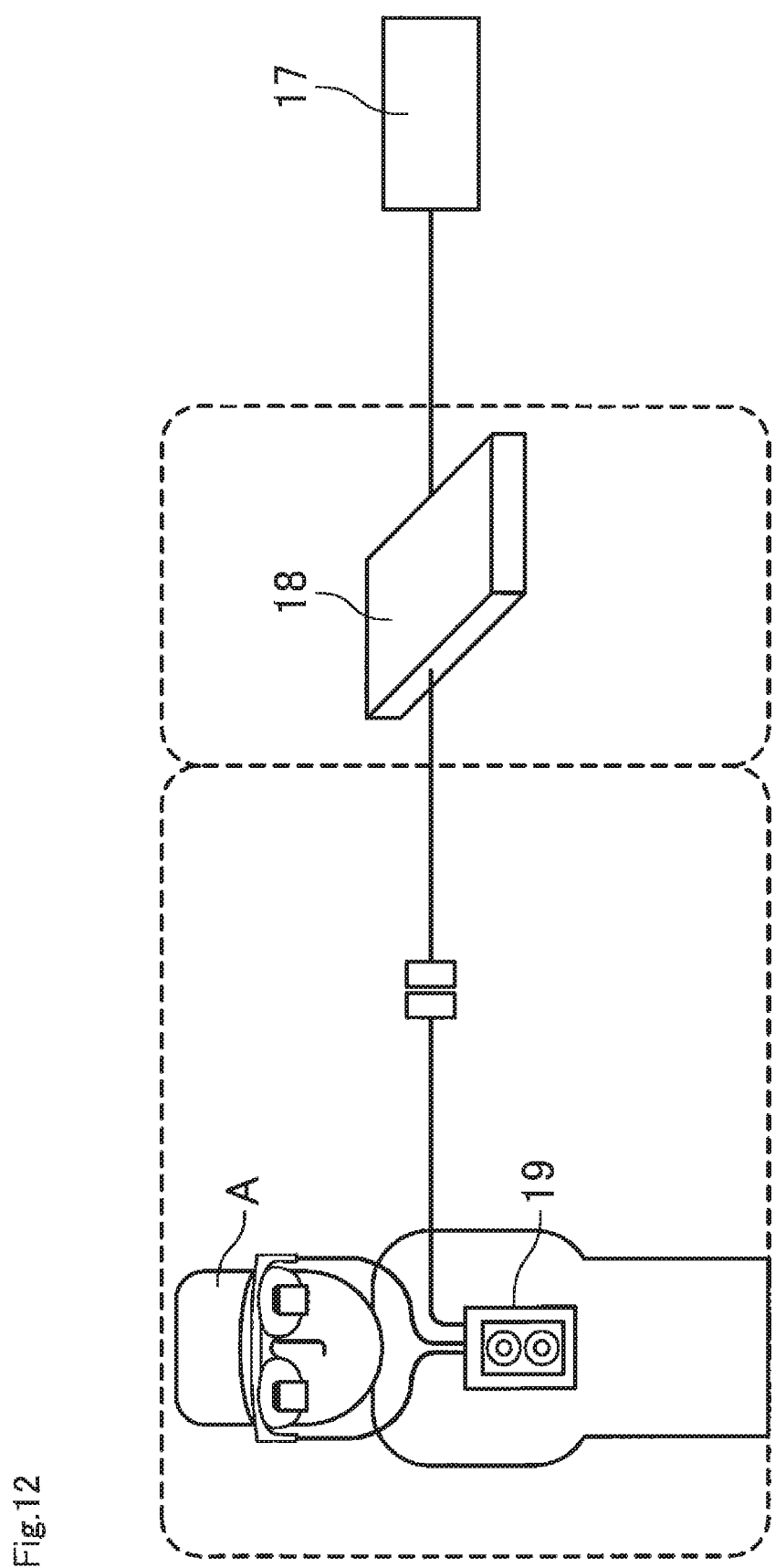
FIG. 12 is a configuration diagram showing another image display system of the present invention.
Figure 13:
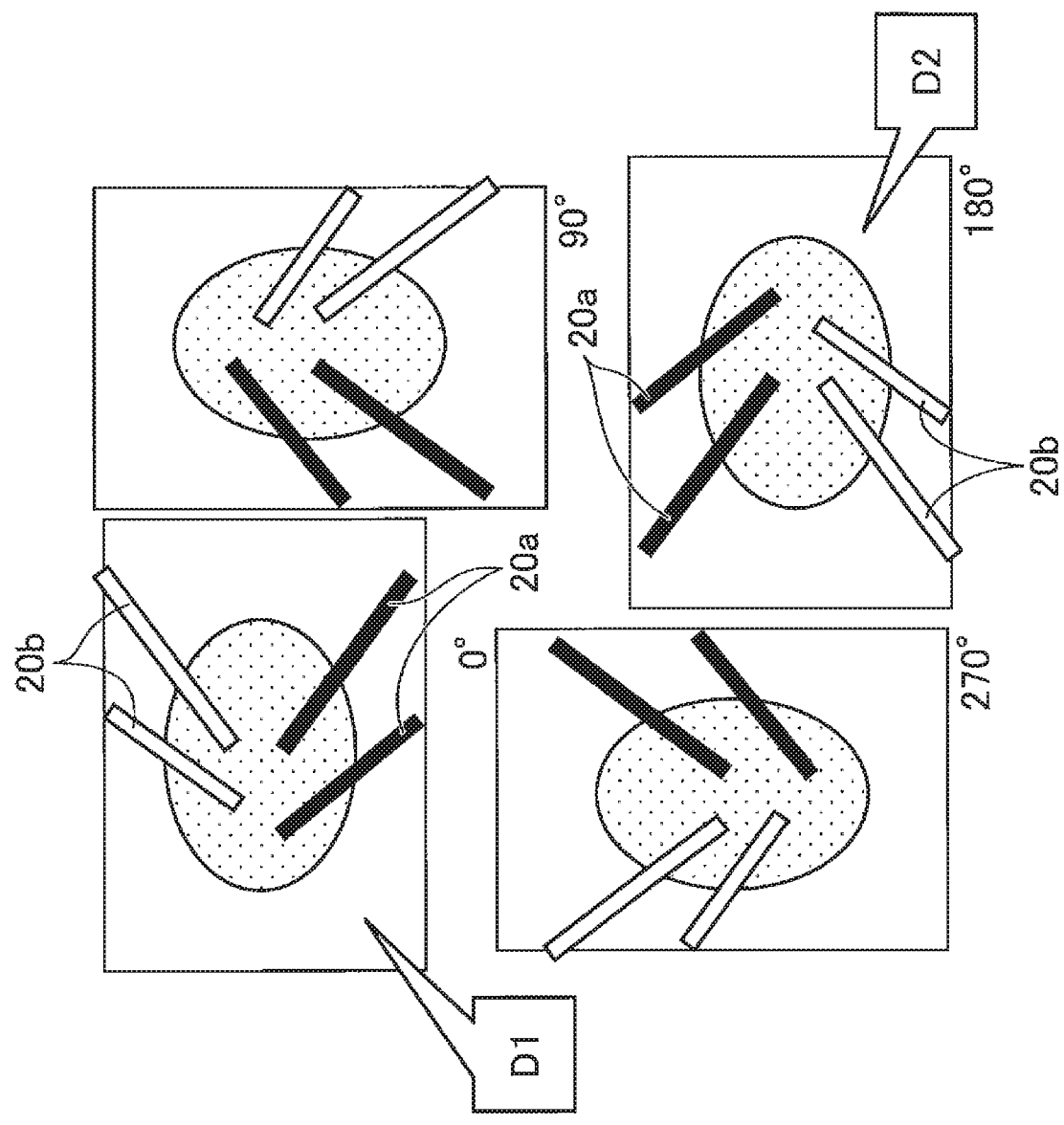
FIG. 13 is a diagram showing rotated images.
Figure 14:
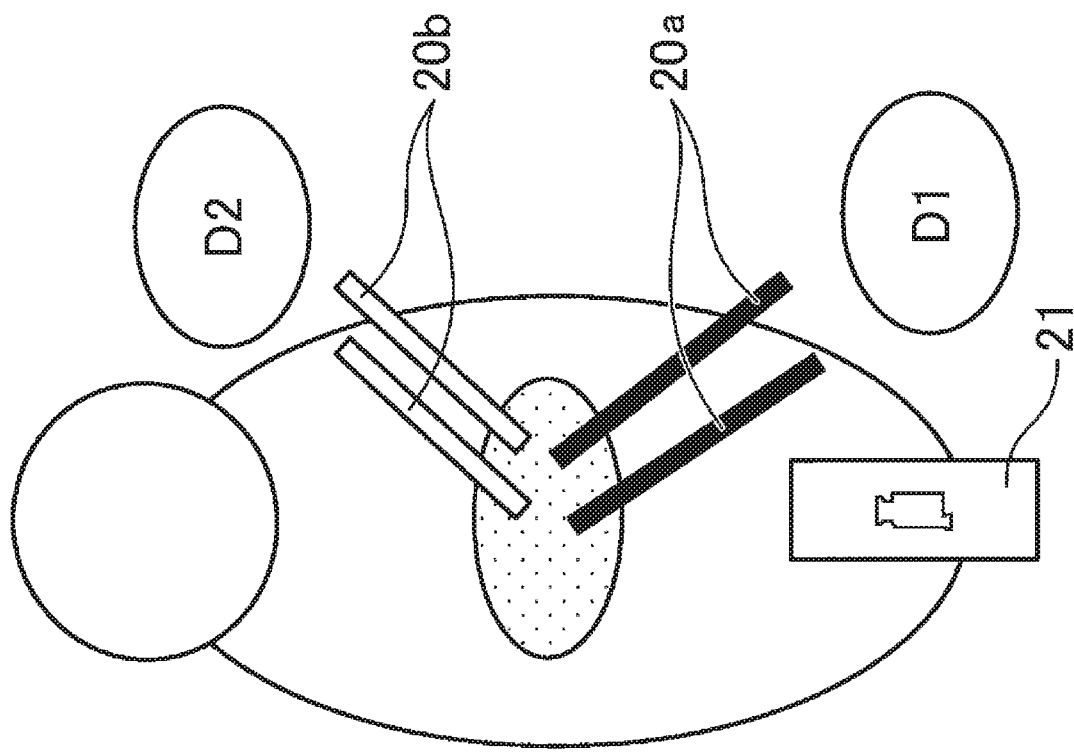
FIG. 14 is a diagram showing the positional relationship among a patient, an endoscope camera, and operators.
Figure 15:
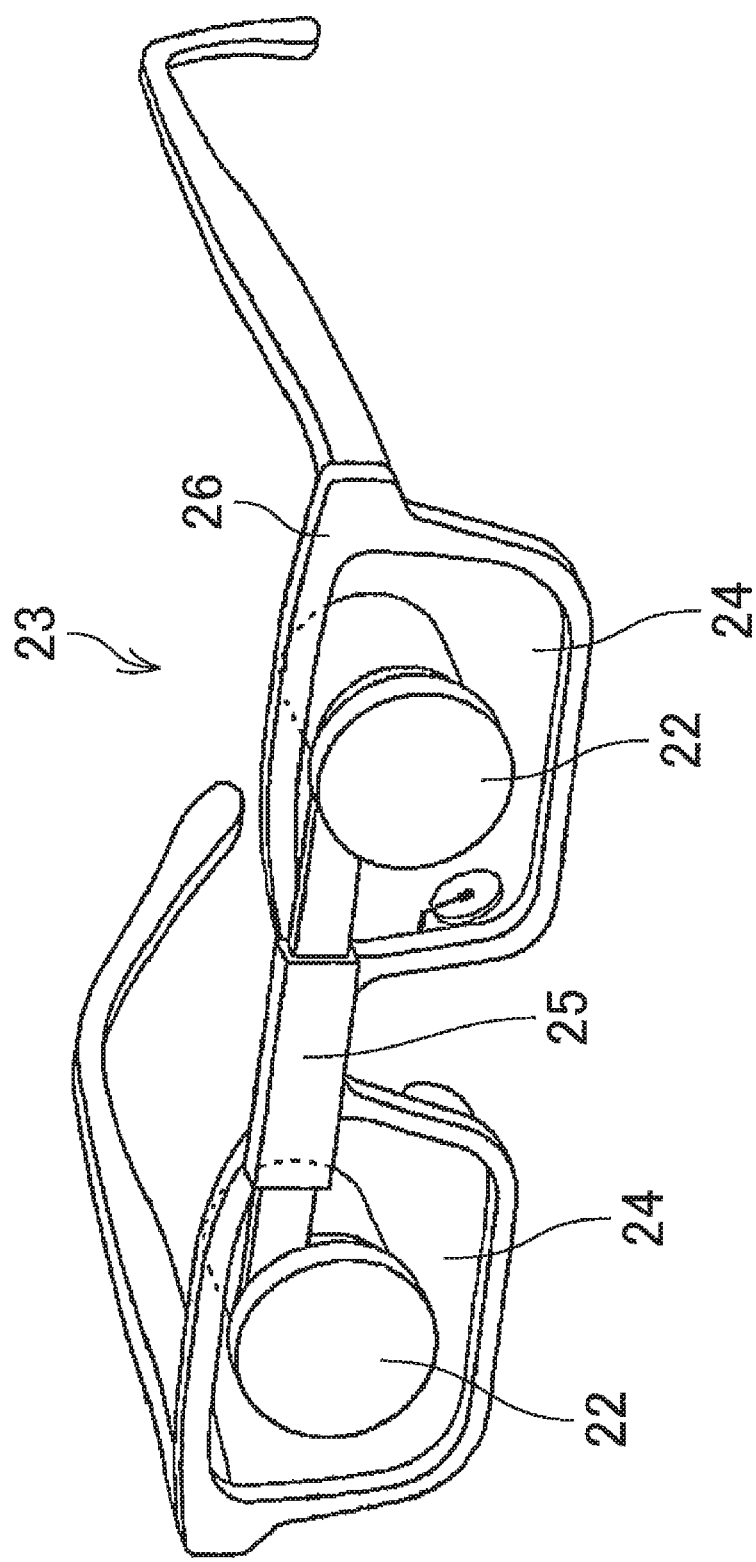
FIG. 15 is a perspective view showing a conventional image display device.
Figure 16:
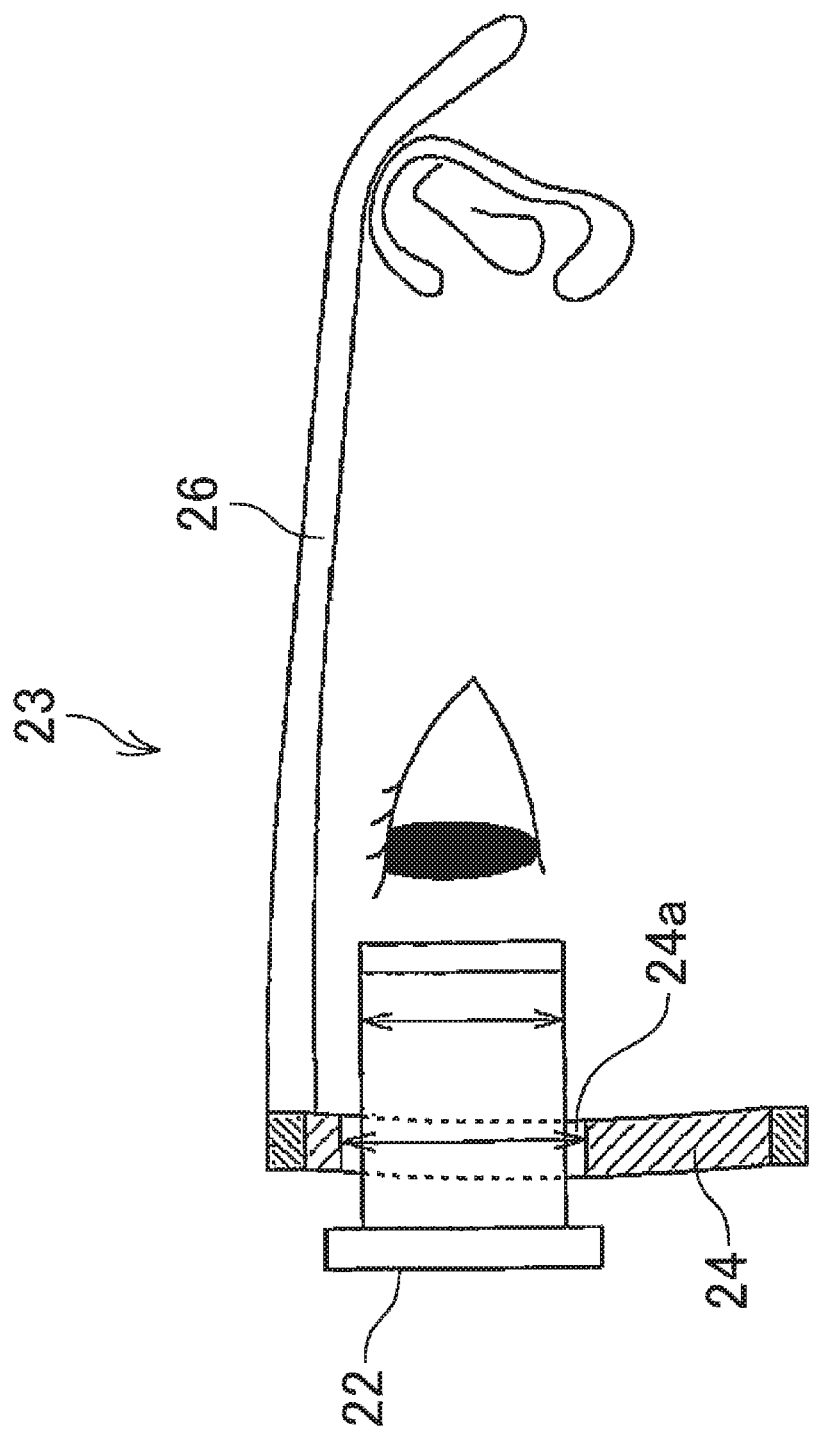
FIG. 16 is a side cross-sectional view showing a use situation of the conventional image display device.

FIG. 12 is a configuration diagram showing another image display system of the present invention. FIG. 13 is a diagram showing rotated images. FIG. 14 is a diagram showing the positional relationship among a patient, an endoscope camera, and operators.

The image display system has a controller 19 provided between a splitter 18 and each of multiple eyeglass-mounted image display devices A.

The controller 19 has functions of allowing the brightness of an image on the viewers 7 to be adjusted and allowing the image on the viewers 7 to be rotated with push buttons. The operator can carry the controller 19 in, for example, the operator's breast pocket to readily operate the controller 19 during surgery.

The ability to rotate the image on the viewers 7 with the controller 19 has the following advantage.

When an operator D1, an operator D2, and an endoscope camera 21 are in a positional relationship shown in FIG. 14, the operator D1 and the endoscope camera 21 are in the same orientation. Assuming that the image angle for the operator D1 is 0°, the image angle convenient for operations performed by the operator D2, who is facing the operator D1, will be 180°.

Therefore, as shown in FIG. 13, the operator D2 can use the controller 19 to rotate the image on the viewers 7 180°, and adjust the brightness of the image as necessary. Both operators D1 and D2 can thus perform endoscopic surgery in a state convenient for operations.

In FIGS. 13 and 14, reference numeral 20a denotes treatment instruments, such as knives, operated by the operator D1, whereas reference numeral 20b denotes treatment instruments, such as knives, operated by the operator D2.

In this manner, the brightness and rotation of the image on the viewers 7 can be individually operated. The operators D1 and D2 can therefore perform endoscopic surgery while maintaining the optimal visual field.

Thus, as described above, according to the eyeglass-mounted image display device of the present invention, the viewers 7 are detachably attached to the eyeglasses 1, and the interval between, height of, and elevation/depression angle of the viewers 7 are adjustable. This enables an operator to use the operator's own eyeglasses while sharing the viewers 7 among operators, thereby enabling cost reduction.

According to the eyeglass-mounted image display device of the present invention, the viewers 7 are disposed in front of the lenses 3a to enable a wider visual field.

According to the eyeglass-mounted image display device of the present invention, the temples 4 near the lenses 3 of the eyeglasses 1 are disposed above the lenses 3 and therefore do not hinder the visual field. This enables a wider visual field especially on the sides.

According to the eyeglass-mounted image display device of the present invention, the viewers 7 are disposed in front of the lenses 3 to eliminate the need to make openings on the lenses 3. This eliminates the need to process the lenses 3 and further eliminates the possibility of scattered objects entering through the lenses 3 during surgery.

According to the eyeglass-mounted image display device of the present invention, the viewers 7 are attached to the third members 12 that are detachably attached to the second member 11. This enables the device to be readily adapted to even a strabismic operator by replacing the third members 12 with third members 12 having a different bend angle.

According to the image display system of the present invention, multiple operators can simultaneously use eyeglass-mounted image display devices. This enables endoscopic surgery to be more appropriately performed.

According to the image display system of the present invention, each operator can individually operate the brightness and rotation of the image on the viewers 7. This enables the operator to perform endoscopic surgery while maintaining the optimal visual field.

REFERENCE SIGNS

1: eyeglasses
2: frame
3: lens
4: temple
5: bridge
6: rim
7: viewer
7a: insertion portion
8: attaching member
9: cable
10: first member
10a: projecting portion
11: second member
12: third member
12a: press portion
13: height adjustment bolt and nut
14: elevation/depression angle adjustment bolt and nut
15: fine-tuning screw
16: fixing screw
17: endoscope system
18: splitter
19: controller
20a: treatment instrument
20b: treatment instrument
21: endoscope camera
22: viewer
23: eyeglasses
24: lens
25: connecting member
26: frame

The invention claimed is:

1. An eyeglass-mounted image display device comprising:
viewers displaying an image from an image output apparatus; and eyeglasses to which the viewers are detachably attached via an attaching member,
wherein the viewers are disposed in front of lenses of the eyeglasses, and the interval between, height of, and elevation/depression angle of the viewers are adjustable with the attaching member, and
the attaching member comprises a first member attached to the eyeglasses in a height-adjustable manner, a second member attached to the first member in an elevation/depression angle-adjustable manner, and a pair of right and left third members detachably attached to the second member in an interval-adjustable manner, and the viewers are attached to the third members.

2. The eyeglass-mounted image display device according to claim 1, wherein the right and left third members are individually attached to the second member.

3. The eyeglass-mounted image display device according to claim 1, wherein the viewers are detachably attached to the third members.

4. The eyeglass-mounted image display device according to claim 1, wherein temples near the lenses of the eyeglasses are disposed above the lenses of the eyeglasses.

5. The eyeglass-mounted image display device according to claim 1, wherein the image output apparatus comprises an endoscope, a microscope, or a video camera.

6. An image display system using the eyeglass-mounted image display device according to claim 1, wherein by being capable of sending an endoscopic image signal to a plurality of eyeglass-mounted image display devices via a splitter.

7. The image display system according to claim 6, wherein a controller is provided between the splitter and each of the plurality of eyeglass-mounted image display devices, the controller having functions of allowing the brightness of an image on the viewers to be adjusted and allowing the image on the viewers to be rotated.

* * * * *